(12) United States Patent
Kilbourne, II et al.

(10) Patent No.: US 7,161,495 B1
(45) Date of Patent: Jan. 9, 2007

(54) ALERT FOR INDICATING VALIDITY OF REMOVABLE MEMORY MEDIA

(75) Inventors: Allen J. Kilbourne, II, Tracy, CA (US); Eric Gumtow, Mountain View, CA (US)

(73) Assignee: Network Applicance, Inc., Sunnyvale, CA (US)

( * ) Notice: Subject to any disclaimer, the term of this patent is extended or adjusted under 35 U.S.C. 154(b) by 423 days.

(21) Appl. No.: 10/836,845

(22) Filed: Apr. 30, 2004

(51) Int. Cl.
 *G08B 5/00* (2006.01)
 *G08B 5/22* (2006.01)
 *G08B 29/00* (2006.01)
 *G08B 17/10* (2006.01)
 *G06F 1/16* (2006.01)
 *F21V 7/04* (2006.01)

(52) U.S. Cl. .......... 340/815.45; 340/506; 340/513; 340/514; 340/815.42; 340/815.55; 340/628; 340/632; 361/683; 361/684; 361/685; 361/686; 362/555; 362/611; 362/612

(58) Field of Classification Search ........ 340/506, 340/513–514, 815.45, 815.42, 815.55, 628–632; 361/683–686; 362/611–612, 555
See application file for complete search history.

(56) References Cited

U.S. PATENT DOCUMENTS

| 5,519,832 | A | * | 5/1996 | Warchol ................ 714/46 |
| 5,860,015 | A | * | 1/1999 | Olson .................. 713/300 |
| 6,762,930 | B1 | * | 7/2004 | Minne' ................ 361/683 |
| 6,867,704 | B1 | * | 3/2005 | Pellegrino ........... 340/815.45 |
| 2003/0136849 | A1 | * | 7/2003 | Adelmann ............ 235/492 |

* cited by examiner

*Primary Examiner*—Daniel Wu
*Assistant Examiner*—Lam Pham
(74) *Attorney, Agent, or Firm*—Suiter Swantz pc llo

(57) ABSTRACT

The present invention is an apparatus for indicating valid data in a removable memory media. In an embodiment of the invention, an alert may be employed with the removable media, such as NVRAM, to indicate that the battery backup is functional and that the memory content may be valid. One type of alert may be a blinking light source, such as a blinking light emitting diode (LED). In a another aspect of the present invention, contents of an appliance, such as a computer or storage controller, may be arranged so that an alert employed on the removable memory media in accordance with the present invention may be visible to an administrator without opening the chassis of the appliance.

21 Claims, 6 Drawing Sheets

ALERT FOR INDICATING VALIDITY OF REMOVABLE MEMORY MEDIA

FIELD OF THE INVENTION

The present invention generally relates to the field of removable memory media, and more particularly to a method and system for indicating valid data in nonvolatile memory.

BACKGROUND OF THE INVENTION

Removable memory media is becoming an evermore prevalent product for data storage. Removable memory media may include a chip, card, board or device containing a memory or other data store for storing data, which is both installable in a computer or equipment, and removable for upgrade, replacement, security protection (storing in a safe location when not in use), service or reinstallation in a different computer system or equipment. One example of removable memory media is solid state memory. Removability of the removable memory media may be effected by a pluggable connector or by mechanical fasteners, rendering the removable memory media a field replaceable unit (FRU) or simply user removable within an appliance, such as a computer or equipment.

In storage applications, random access memory may be preferable to read only memory because random access memory provides greater data transfer capability. Consequently, in data transactions where consumers require fast access to data, random access memory is the preferred type of memory to serve these types of data transactions. A drawback associated with random access memory is the loss of valid data upon loss of power.

Nonvolatile memory, such as nonvolatile random access memory (NVRAM), is a form of random access memory whose contents remain stored when an appliance is turned off or loses its external power source. The term appliance as used herein may include, for example, a computer or storage controller in which the nonvolatile memory is employed. NVRAM is typically implemented by providing the random access memory with a battery backup. As a result, if the appliance which is employing the NVRAM loses power, the data stored on the NVRAM may be valid and available as long as the battery backup is functional and providing power to the NVRAM.

A problem associated with NVRAM lies in the inability to easily determine whether the data on the NVRAM is available when the appliance employing the NVRAM is powered off. This problem is exacerbated because NVRAM may be implemented on a card or board, and the card may be installed within the chassis of an appliance. Thus, an administrator desiring to know whether the data on the NVRAM is available when the appliance is powered off is typically required to open the chassis, remove the NVRAM card, and test the NVRAM card to determine if the battery has available battery capacity. Further, when transferring NVRAM cards from one appliance to another, which may be necessary during an upgrade of a storage system, it is desirable to know when the data content of the NVRAM is no longer valid due to a failure of its battery. Consequently, a method and system for indicating valid data in a removable memory media is necessary.

SUMMARY OF THE INVENTION

Accordingly, the present invention is directed to a method and system for indicating valid data in a removable memory media. In an embodiment of the invention, an alert may be employed with the removable memory media, such as NVRAM, to indicate that the battery backup is functional and that the data content may be valid. The alert may provide a visible and/or audible indication. One type of alert may be a blinking light source, such as a blinking light emitting diode (LED).

In a another aspect of the present invention, the components of an appliance, such as a computer or a computing system of a storage system, may be arranged so that a visible alert incorporated with the removable memory media in accordance with the present invention and placed within an appliance may be visible to an administrator without opening the chassis of the appliance. For example, a transparent section or a plurality of apertures may be integrated within the chassis to allow visibility of the alert of the removable memory media without opening the chassis of the appliance. This may be advantageous as it may allow an administrator to easily determine that the data stored on the removable memory may be valid.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
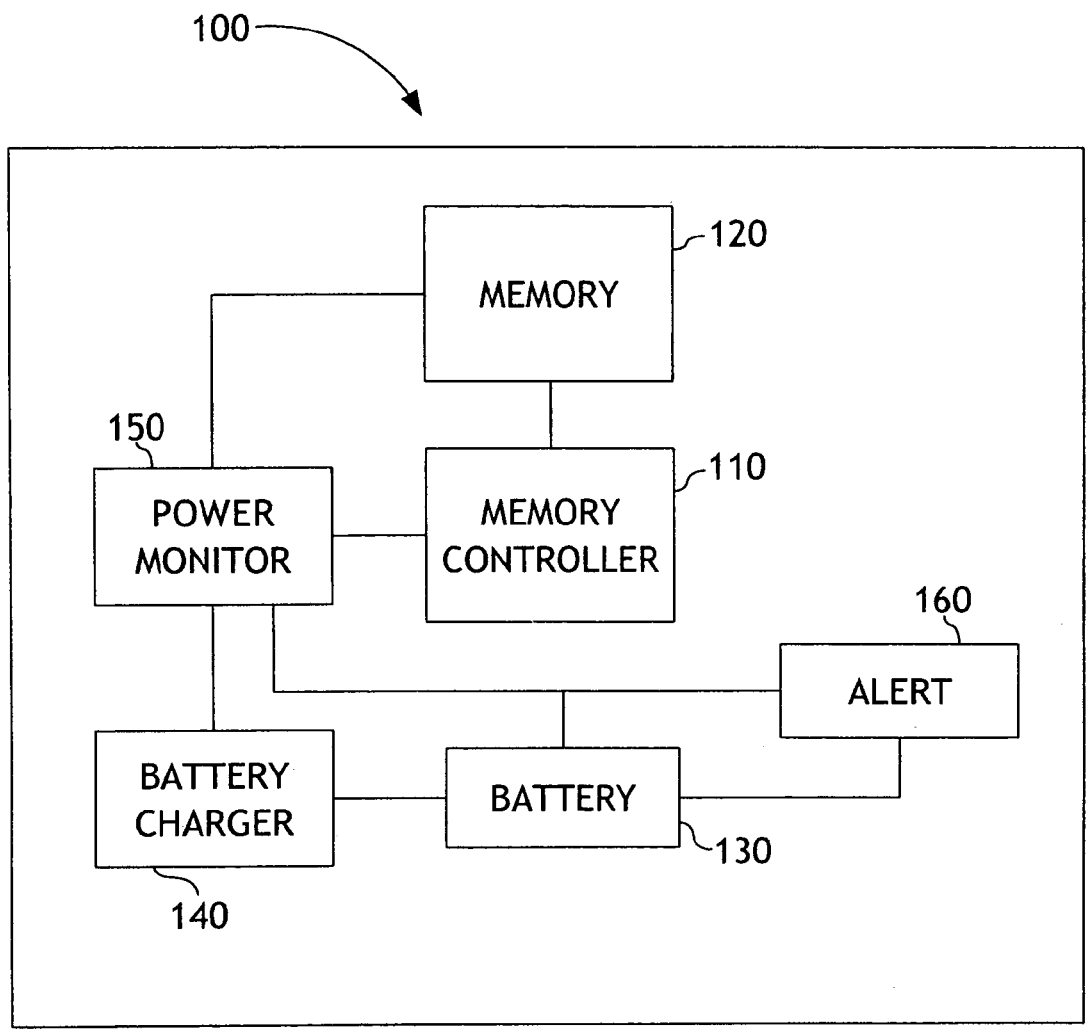
FIG. 1 depicts a block diagram of a removable memory media in accordance with an embodiment of the present invention.

Referring to FIG. 1, a block diagram of a removable memory media 100 in accordance with an embodiment of the present invention is shown. It is contemplated that removable memory media may include a chip, card, board or device containing a memory or other data store for storing data, which is both installable in a computer or equipment, and removable for upgrade, replacement, security protection (storing in a safe location when not in use), service or reinstallation in a different computer system or equipment. One example of removable memory media is solid state memory. Removability of the removable memory media may be effected by a pluggable connector or by mechanical fasteners, rendering the removable memory media a field replaceable unit (FRU) or simply user removable within an appliance, such as a computer or equipment.

It is further contemplated that the FIG. 1 depicts functional capability of the removable memory media 100 of the present invention and may or may not refer to specific components. An advantageous aspect of the removable memory media of the present invention is the ability to indicate whether the content stored within the memory 120 of the removable memory media may be valid. In exemplary applications, removable memory media 100 may be implemented on a card or board, the card or board being removably inserted within an appliance. In an embodiment of the invention, the board may be utilized to support high write performance platforms in storage controllers of mass storage systems. In such a system, the removable memory media 100 typically receives power from a power bus of the appliance when inserted within a receiving receptacle of the appliance.

In one embodiment of the invention, removable memory media 100 may be a nonvolatile random access memory (NVRAM). A battery 130 provides a power backup to the power supplied by the appliance that ensures nonvolatile memory. Thus, if the removable memory media 100 is inserted with a receiving receptacle of an the appliance, and the appliance should have a power disruption thus removing the primary power source to the removable memory media 100, battery 130 may provide temporary power for the removable memory media 100 to retain the data content of the memory 120. A problem associated with removable memory media known to the art is the lack of any indication of whether the battery 130 is supplying power to the removable memory media 100 which would allow an administrator to know if the contents of the memory 120 may be valid. As used herein, administrator may refer to a person responsible for maintaining a group or network of computer systems (one or more) and related resources. The term may be extended to include service providers that assist the administrator in servicing, upgrading, troubleshooting and repairing the computer systems or network.

Removable memory media 100 of the present invention may include a memory controller 110, memory 120, battery 130, battery charger 140, power monitor 150 and an alert 160. Memory controller 110 may control the reading and writing of data to and from memory 120, to and from a data transfer bus, such as a peripheral component interconnect extended bus (PCI-X). Memory controller may include a port, receptacle, pluggable connector, bus interface and the like for transferring data. Memory 120 may store data. In an embodiment of the invention, memory 120 may be random access memory such as static random access memory (SRAM). Battery 130 may be a rechargeable battery and may supply power when the removable memory media 100 is not receiving power from an outside source, such as from an appliance. Battery charger 140 may be employed with the power monitor 150 to recharge battery 130 when the removable memory media 100 is receiving power from an outside source.

Power monitor 150 may include a port, receptacle, pluggable connector, bus interface and the like for receiving power from an outside source, such as a receiving receptacle or power bus of an appliance. Power monitor 150 may also include battery voltage detection. Based upon the current voltage of the battery 130, battery charger 140 may be engaged to recharge the battery 130. In an embodiment of the invention, power monitor 150 may supply 2.5 Volts to memory controller 110 and memory 120. Power monitor 150 may include a switch, circuitry and the like for detecting a loss of power from an outside source and allowing power to be provided to memory 120 by the battery 130. In an alternative embodiment of the invention, power may be supplied from an outside source or a battery, as necessary to power monitor 150. Power monitor 150 may supply 2.5 Volts to a memory controller 110, whereby memory controller 110 provides power to memory 120.

An advantageous aspect of the removable memory media 100 of the present invention is the alert 160 coupled to the battery 130. Alert may be an audible or visible indication power is being provided for the removable memory media, either through an outside source (primary power source) or through battery 130. In an embodiment of the invention, alert 160 may be a light emitting diode. It is contemplated that circuitry may be employed in conjunction with the alert to flash the audible or visible indication. Flashing may refer to multiple successive periods, whereby each period includes a portion of visible light or sound followed by a period of no light or sound. An example may be a blinking light emitting diode whereby the period includes a portion of time where the LED is lit followed by a portion of time where the LED is not lit. This may be advantageous as it may reduce the impact upon battery capacity.

Figure 2A:
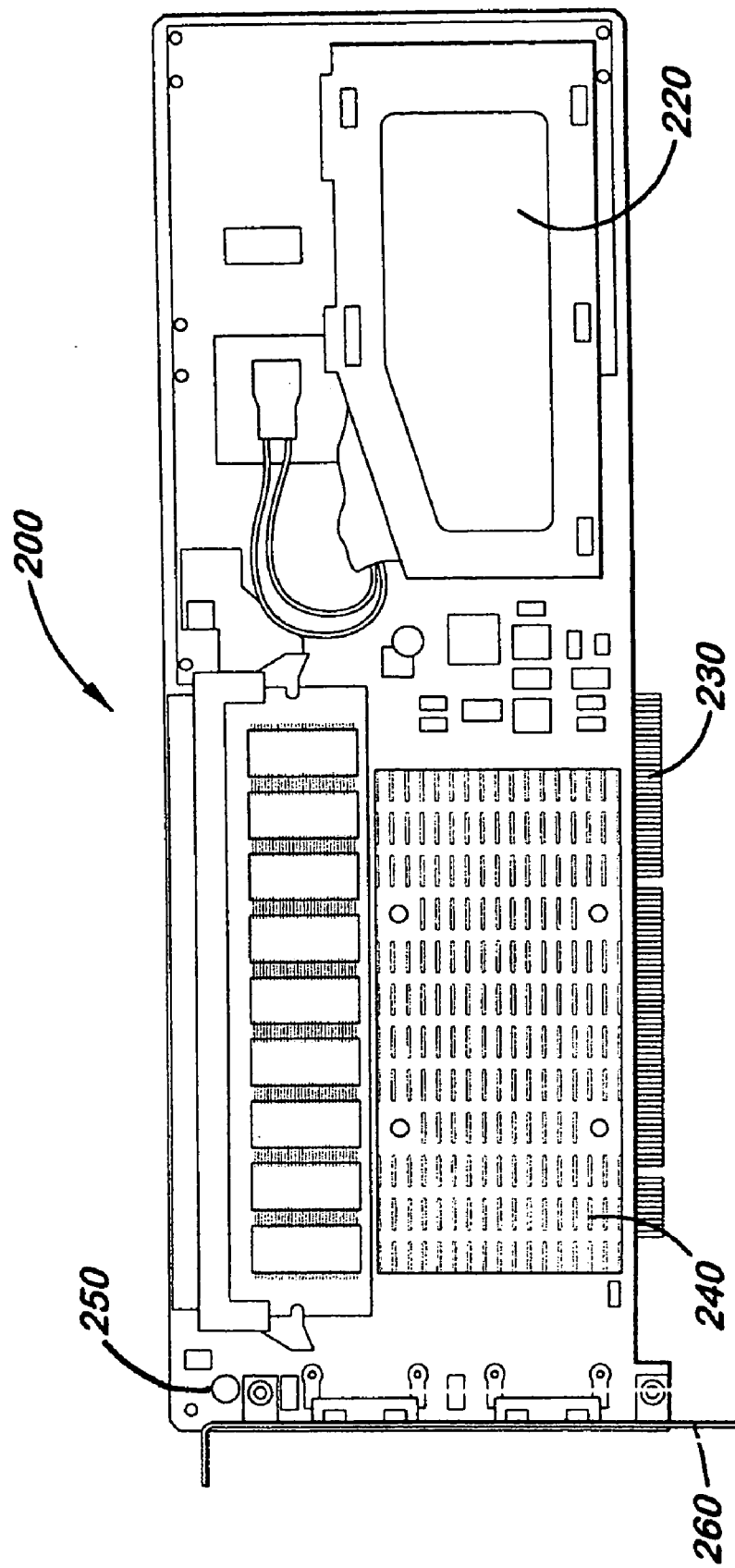
FIGS. 2A and 2B depict side and perspective views of an embodiment of a removable memory media in accordance with the present invention.
Figure 2B:
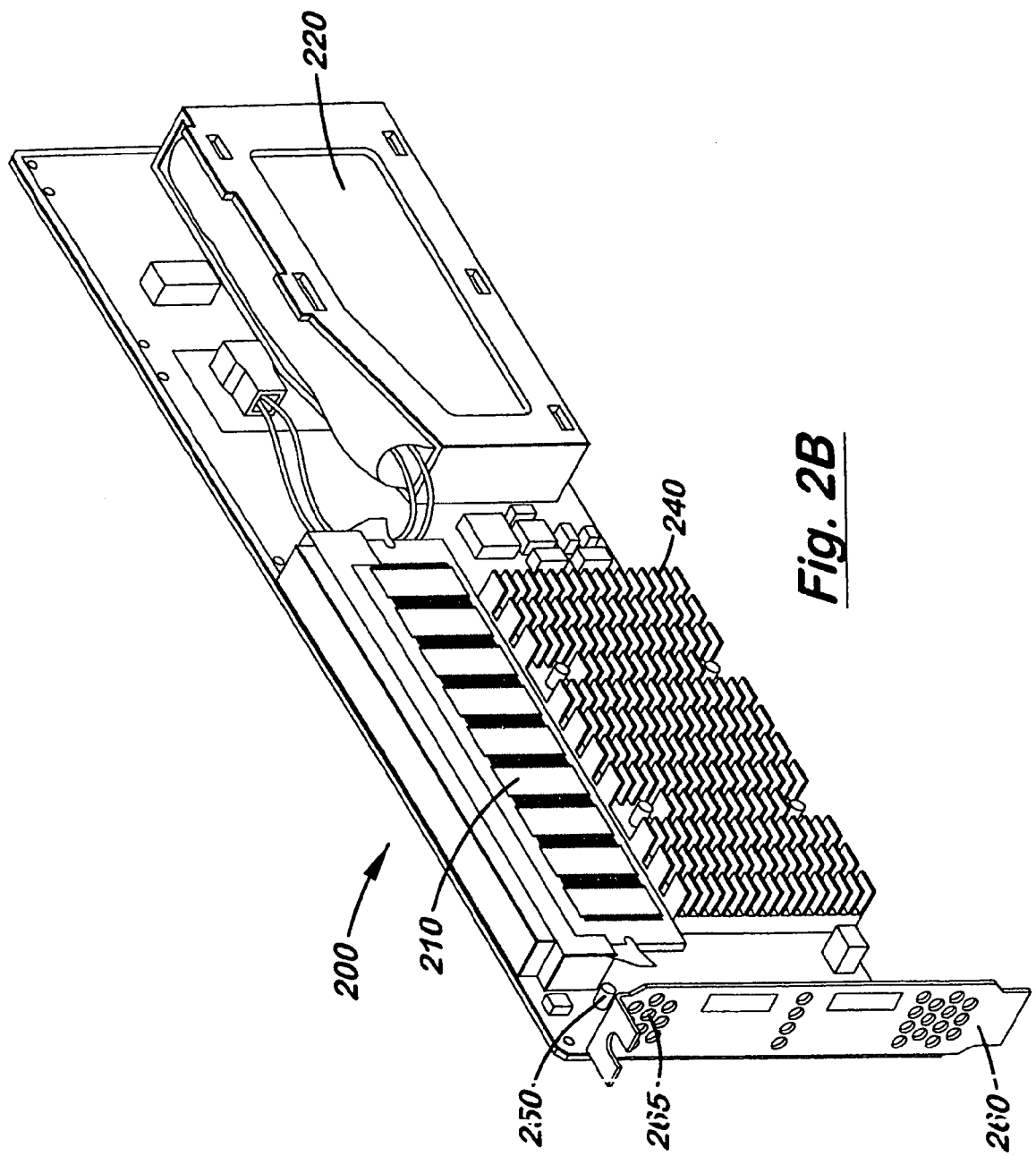

Referring to FIGS. 2A and 2B, side and perspective views of an embodiment of a removable memory media 200 in accordance with the present invention are shown. Removable memory media 200 is implemented on a housing for securing random access memory 210, rechargeable battery 220, port 230, heat sink 240, light emitting diode 250, and frame 260. Housing may be a board, chip, card, or device. Removable memory media 200 includes the functional capability of removable memory media 100 as shown in FIG. 1. As shown in FIG. 2, removable memory media 200 is in the form of a field replaceable unit, whereby said removable memory media may be removed from an appliance, computing system, equipment and the like; and then may be stored, secured, or re-installed in another appliance and the like.

Removable memory media 200 may include random access memory 210 for data storage. A rechargeable battery 220 is included to provide backup power when power from an outside source, such as an appliance, is not available. Port 230 may allow easy coupling to a receiving receptacle of an appliance. Port 230 may provide transfer of data with other components of an appliance and may also receive power from the appliance. Heat sink 240 may be employed to effectively disperse heat generated on the board of the removable memory media 200. A light emitting diode 250, coupled to said battery 220, may be employed as a visual alert which may indicate if the data content stored in the random access memory 210 is valid. Advantageously, apertures 265 may be placed in frame 260 to allow visibility of the light emitting diode 250 from the front of the board of the removable memory media 200.

Figure 3:
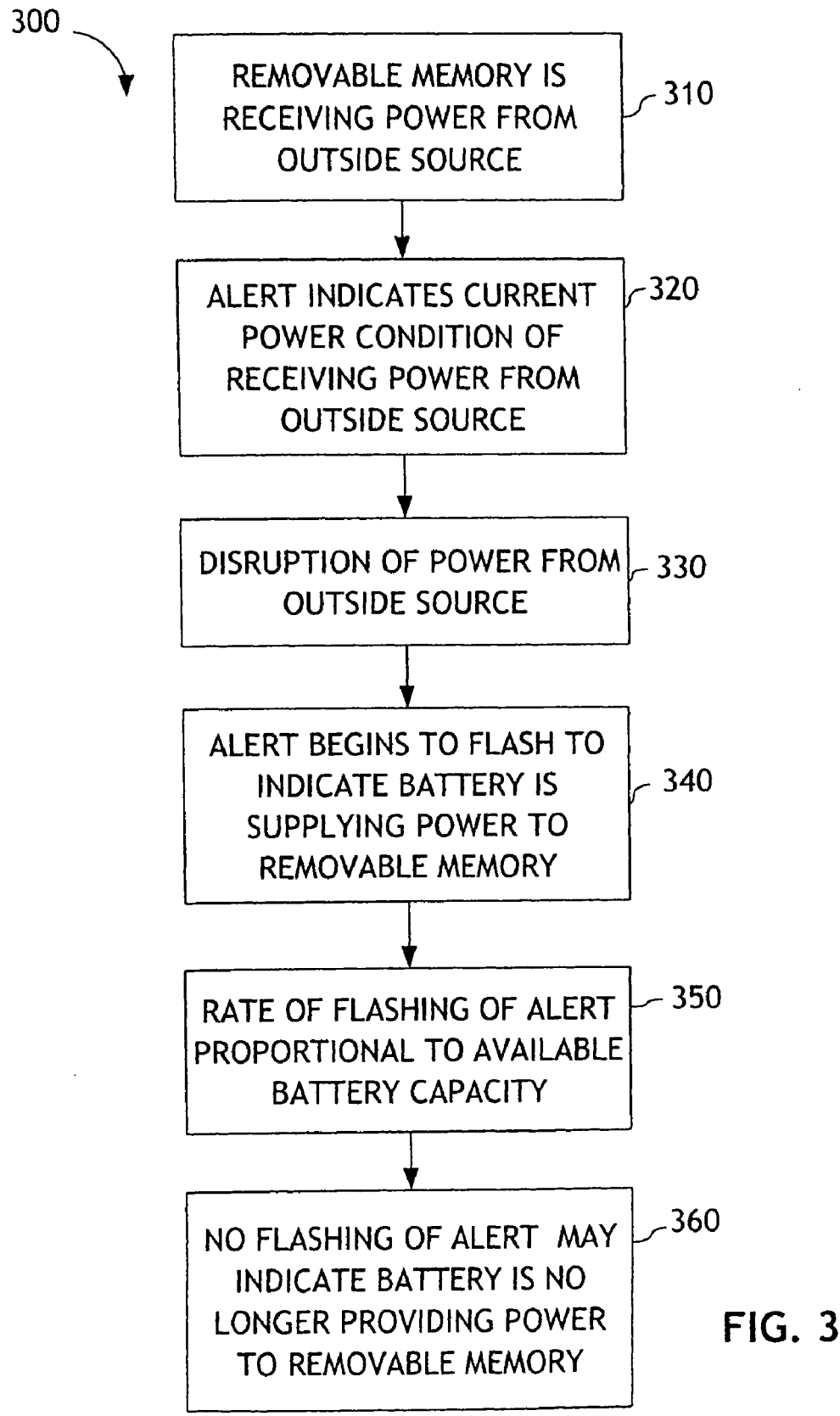
FIG. 3 depicts a flow diagram of a process for alerting a user that the data content of a removable memory media may be valid.

Referring to FIG. 3, a flow diagram of a process 300 for alerting an administrator that the data content of a removable memory media may be valid is shown. The process 300 may begin when the removable memory media is receiving power from an appliance 310. An example of a removable memory media receiving power from an outside source may be when the removable memory media is installed within an appliance, the appliance providing power to the removable memory media via a power bus or through its receiving receptacle for securing the removable memory media. When the removable memory media is receiving power from an appliance or other outside source, an alert integrated with the removable memory media may indicate that the removable memory media is receiving power from an outside source 320. For example, in an embodiment of the invention where the alert is a visible light source, such as a LED, the LED may be constantly lit to indicate that the removable memory media is receiving power from an outside source. In the example of an audible alert, a constant tone may be produced to indicate that the removable memory media is receiving power from an outside source. Alternatively, the audible alert may include a clicking sound or may require a user to depress an actuator to hear the alert. For example, a user may depress a button located on the removable memory media to hear the alert. It is contemplated that a depressable button may require actuation for a user to see the alert when the alert is a visible indication.

In the course of operation, a removable memory media may have a disruption of power from an outside source 330. For example, a disruption of power received from an outside source may occur when an administrator removes the removable memory media from the appliance which is providing power to the removable memory media. Additionally, a disruption of power may occur when an appliance, currently providing power to the removable memory media, loses power. When a disruption of power to the removable memory media from an outside source occurs, an alert may begin to flash to indicate that the backup battery is currently supplying power to the removable memory media 340. For example, an alert in the form of a light emitting diode alert may flash on and off, i.e., may be lit and then not lit. In one embodiment of the invention, the light emitting diode may flash on for thirty (30) milliseconds for every two (2) seconds. This is advantageous as it may reduce an amount of drain on the battery of the removable memory media which is now supplying power for the removable memory media. Alternatively, a pulsing audible alert may be produced to indicate that the backup battery is currently supplying power to the removable memory media.

In an advantageous aspect of the present invention, the rate of flashing of the alert may be proportional to an amount of battery capacity remaining for the battery 350. It is contemplated that step 350 is an alternative embodiment of the invention as an additional advantageous feature, and not departing from the scope and intent of the present invention. For example, if the battery capacity is at a high level, the rate of flashing may be a higher frequency. As the battery capacity of the backup battery for the removable memory media reduces, the frequency rate of flashing may be proportionately reduced. When the alert is no longer flashing, this may indicate that the battery is no longer providing power to the removable memory media 360. When this occurs, an administrator may be alerted that the data content of the memory of the removable memory media may not be available and may be unrecoverable.

An advantageous aspect of the present invention is the ability for an administrator to easily determine that the data content may be valid, even though there has been a disruption of power being supplied from an outside source. This indication, through a flashing visible or audible alert, may notify the administrator that an external power source is necessary to ensure the validity of the data stored on the removable memory media.

It is contemplated that upon a disruption of power from an outside source (step 330 of FIG. 3) and the flashing alert to indicate to an administrator that the battery backup is supplying power to the removable memory media, power from an outside source may be restored. When power from an outside source is restored, the alert may reflect the current condition that power is currently being supplied from the outside source. If the battery was supplying power to the removable memory media during the power disruption, as indicated by the flashing alert, then the data content of the removable memory media may be valid. When power has been restored, power is being supplied by an outside source. Further, in an embodiment of the invention, the backup battery of the removable memory media may be recharged. This is advantageous as it will provide a maximum amount of time the battery can temporarily provide power for the removable memory media during a power disruption from an outside source.

Figure 4:
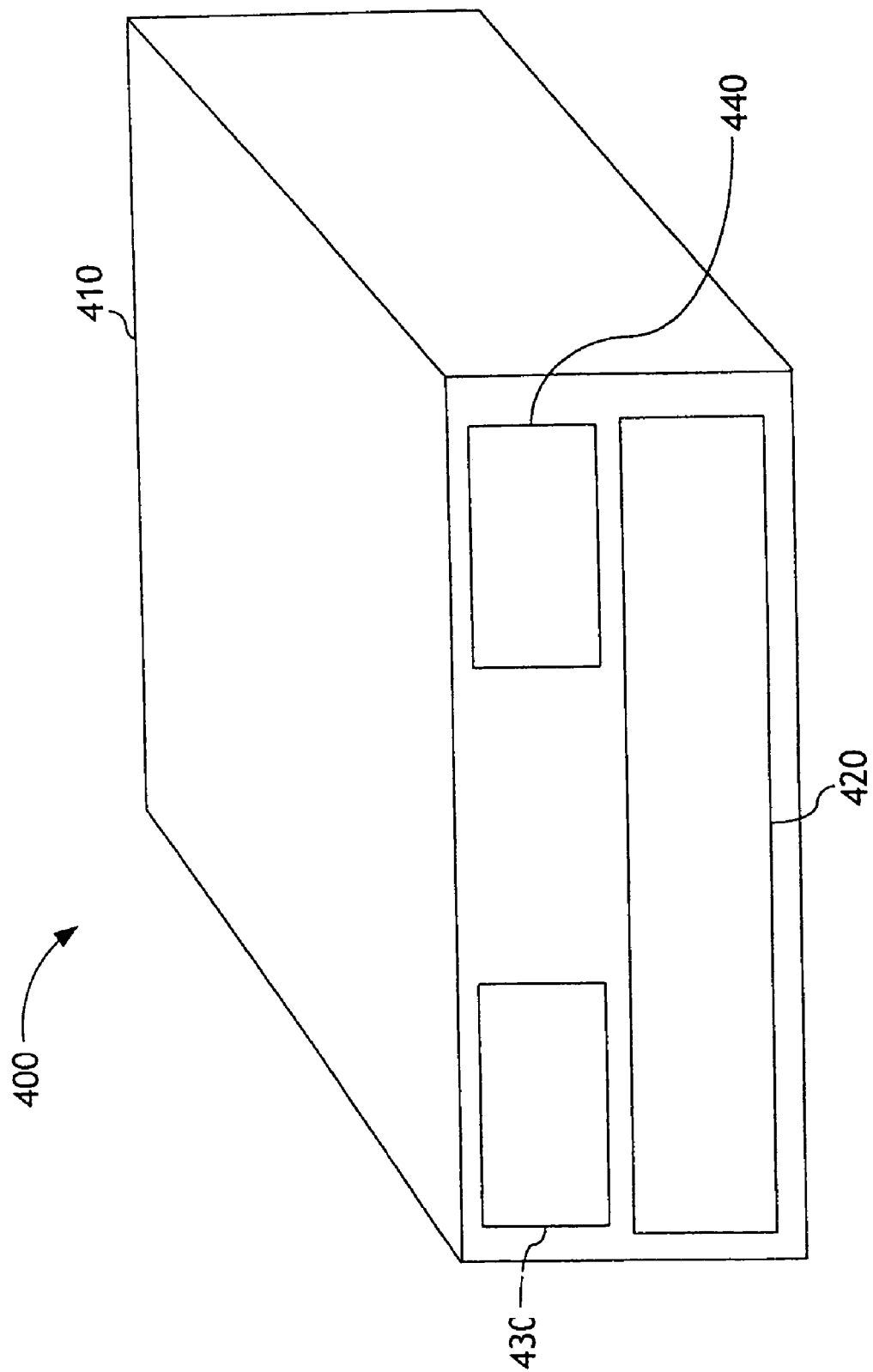
FIG. 4 depicts an appliance in accordance with an embodiment of the present invention.

Referring to FIG. 4, an appliance 400 in accordance with an embodiment of the present invention is shown. Appliance 400 may be in the form of a storage controller, personal computer and the like in which removable memory media is employed. Appliance 400 in accordance with the present invention may include removable memory media 100 as shown in FIG. 1.

Appliance 400 may include a chassis 410 and a contents viewing port 420, and various interfaces 430–440 to enable the desired features of the appliance 400. It is contemplated that appliance 400 may include, for example, removable memory media 100, a processor, network interfaces, a hard drive, internal bus and the like (not shown). In an advantageous aspect of the present invention, contents of the appliance 400 may be arranged within the chassis 410 such that an alert 160 of the removable memory media 100, in the form of a visible alert, may be visible by a user through the contents viewing port 420 of the appliance 400. For example, removable memory media 200 may be installed within appliance 400 whereby the light emitting diode 250 may be visible to an administrator through the contents viewing port 420. It is possible, in an embodiment of the invention, that the light emitting diode 250 may be visible to an administrator through the contents viewing port 420 and the apertures of frame 260 of the removable memory media 200.

It is contemplated that contents viewing port 420 may be a transparent cover which allows a user to view the contents of the appliance 400. In an alternative embodiment of the present invention, contents viewing port 420 may include apertures whereby a user may view the contents of the appliance. In an advantageous aspect of the present invention, apertures may improve ventilation of the appliance 400 to disperse heat produced by a processor and other components of the appliance 400. It is further contemplated that other types of contents viewing port 420 may be employed by those with ordinary skill in the art to allow viewing access to an alert of a removable memory media of the present invention without departing from the scope and intent of the present invention.

Figure 5:
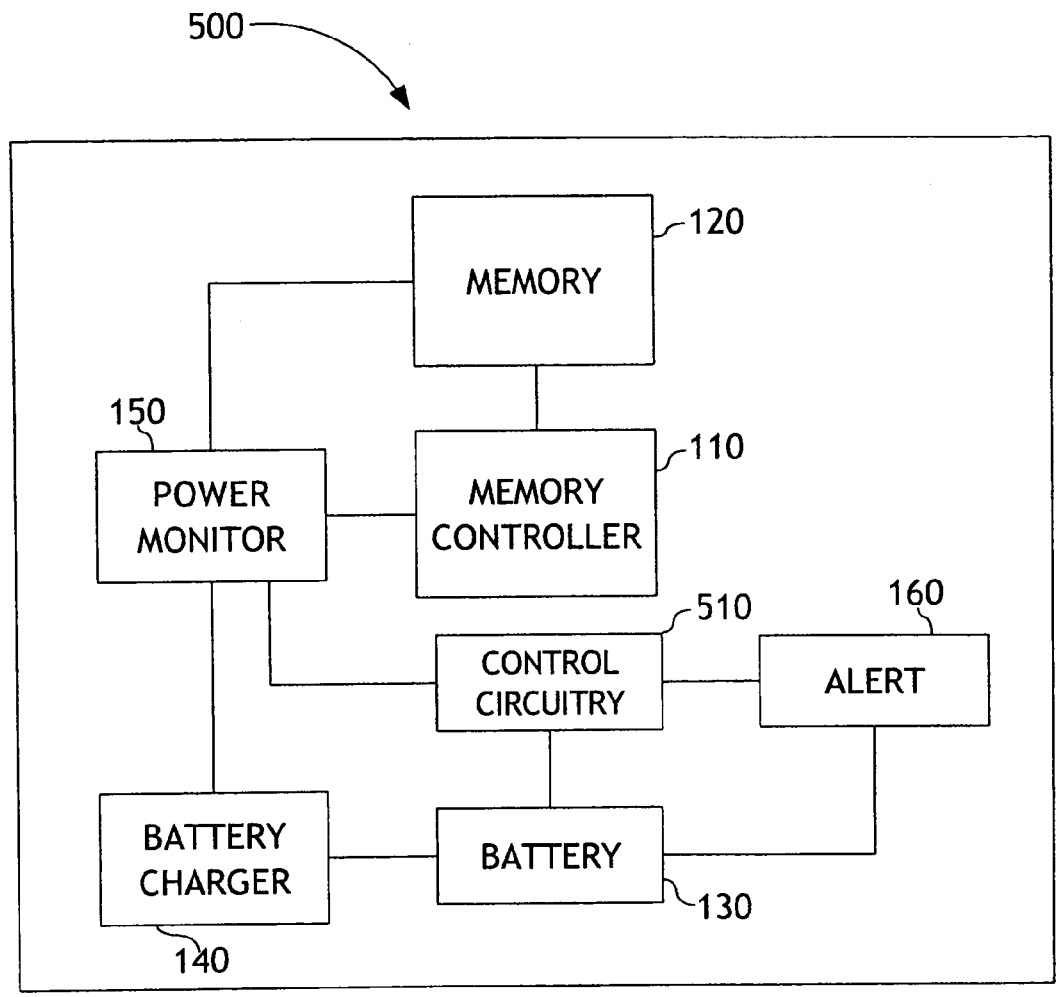
FIG. 5 depicts a block diagram of a removable memory media in accordance with an alternative embodiment of the present invention.

In an alternative embodiment of the present invention, it is contemplated that a control circuit may be included with the removable memory media. For instance, removable memory media 500 of FIG. 5 may include a memory controller 110, memory 120, battery 130, battery charger 140, power monitor 150 and alert 160 as shown in described in FIG. 1, along with control circuitry 510. Control circuitry 510 may cause the alert to not be "on", (i.e., lit in the example of a light emitting diode) if there is any appreciable time gap in power delivery to the random access memory from the primary power source and the battery, the backup power source. A threshold for the time gap may be a period of time which would invalidate the data held in the memory. As an example, the control circuitry 510 could prevent the light emitting diode from turning on if there was a loose battery connection when the removable memory media is removed from its primary power source if a threshold amount of time has elapsed such that the data held in the memory would be invalid.

While nonvolatile random access memory has been disclosed as a type of removable memory media, other forms of removable memory media may be utilized in accordance with the present invention without departing from the scope and intent of the present invention. Further, it is contemplated that other types of lights may be utilized as a visible alert other than light emitting diodes without departing from the scope and intent of the present invention.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A removable memory media, comprising:
   a memory controller;
   a random access memory coupled to said memory controller;
   a battery for supplying supplemental power for said removable memory media; and
   an alert coupled to said battery, wherein said removable memory media is capable of receiving power from an outside source, said battery providing power for said removable memory media when power from said outside source is unavailable, said alert indicating valid data in the random access memory.

2. The removable memory media as claimed in claim 1, wherein said removable memory media is a field replaceable unit.

3. The removable memory media as claimed in claim 1, wherein said alert provides at least one of a visible indication and an audible indication.

4. The removable memory media as claimed in claim 3, wherein said visible indication is provided by a light emitting diode.

5. The removable memory media as claimed in claim 1, whereby an amount of available battery capacity is indicated by a frequency of flashing of said light emitting diode.

6. The removable memory media as claimed in claim 5, whereby a higher frequency of flashing of said light emitting diode indicates a larger amount of available battery capacity.

7. The removable memory media as claimed in claim 1, further comprising a battery charger, wherein said battery charger recharges said battery to a higher battery capacity when power from said outside source is available.

8. A removable memory media, comprising:
   a memory controller;
   a random access memory coupled to said memory controller;
   a battery for supplying supplemental power for said removable memory media;
   a means for alerting a user, and
   a housing, said housing securing said memory controller, said random access memory, said battery and said alerting means, said housing being removable as a unit, wherein said removable memory media is capable of receiving power from an outside source, said battery providing power for said removable memory media when power from said outside source is unavailable, said alerting means indicating valid data in the random access memory.

9. The removable memory media as claimed in claim 8, wherein said alerting means provides at least one of a visible indication and an audible indication.

10. The removable memory media as claimed in claim 8, whereby an amount of available battery capacity is indicated by a frequency of flashing of said alerting means.

11. The removable memory media as claimed in claim 10, whereby a higher frequency of flashing of said alerting means indicates a larger amount of available battery capacity.

12. The removable memory media as claimed in claim 8, further comprising a battery charger, said battery charger being secured by said housing, wherein said battery charger recharges said battery to a higher battery capacity when power from said outside source is available.

13. The removable memory media as claimed in claim 8, wherein said housing includes a port for securing said housing to a receptacle.

14. A removable memory media, comprising:
   a memory controller;
   a random access memory coupled to said memory controller;
   a battery for supplying supplemental power for said removable memory media;
   a battery charger for recharging said battery to a higher battery capacity;
   an alert coupled to said battery, wherein said removable memory media is formed as a field replaceable unit, said removable memory media being capable of receiving power from an outside source, said alert indicating valid data in the random access memory.

15. The removable memory media as claimed in claim 14, whereby an amount of available battery capacity is indicated by a frequency of flashing of said light emitting diode.

16. The removable memory media as claimed in claim 15, whereby a higher frequency of flashing of said light emitting diode indicates a larger amount of available battery capacity.

17. The removable memory media as claimed in claim 14, further comprising a control circuit, said control circuit being capable of determining if power has been unavailable to said memory controller greater than a threshold period.

18. The removable memory media as claimed in claim 17, wherein said alert will be prevented from indicating valid data in memory when power has been unavailable to said memory controller greater than said threshold period.

19. An appliance, comprising:
   a chassis;
   a contents viewing port integrated within said chassis; and
   at least one removable memory media, said at least one removable memory media formed on a card, said card being integrated within said chassis and being formed as a field replaceable unit, said removable memory media card including:
   a memory controller;
   a random access memory coupled to said memory controller;

a battery for supplying supplemental power for said removable memory media;

a battery charger for recharging said battery to a higher battery capacity; and a light emitting diode coupled to said battery, said removable memory media card being capable of receiving power from said appliance, said battery providing power for said removable memory media card when power from said appliance is unavailable, said light emitting diode indicating valid data in the random access memory, said light emitting diode being visible to a user through said contents viewing port.

20. The appliance as claimed in claim 19, wherein said contents viewing port is a transparent cover.

21. The appliance as claimed in claim 19, wherein said contents viewing port includes a plurality of apertures.

* * * * *